(12) United States Patent
Kang

(10) Patent No.: US 6,301,795 B1
(45) Date of Patent: *Oct. 16, 2001

(54) TILT SENSOR USING MAGNET AND MAGNETIC SENSOR

(75) Inventor: Joon-Won Kang, Plymouth, MN (US)

(73) Assignee: Honeywell Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,162

(22) Filed: Sep. 11, 1998

(51) Int. Cl.[7] .............. G01C 9/10; G01C 15/10; G01C 9/06
(52) U.S. Cl. ............. 33/366.12; 33/366.11; 33/366.15; 33/365; 33/366.18
(58) Field of Search ................. 33/100, 366.12, 33/366.15, 366.18, 366.19, 366.21, 366.22, 366.25, 366.26, 366.11, 365; 324/207.24

(56) References Cited

U.S. PATENT DOCUMENTS

| | | |
|---|---|---|
| 4,493,155 | 1/1985 | Comeau et al. . |
| 4,587,741 | 5/1986 | Rorden et al. . |
| 4,603,484 * | 8/1986 | Strothmann .............. 33/366 |
| 4,707,927 * | 11/1987 | Hiyama ................... 33/366 |
| 4,803,426 | 2/1989 | Odagawa et al. . |
| 4,866,379 | 9/1989 | Odagawa et al. . |
| 4,866,850 * | 9/1989 | Kelly et al. .............. 33/366 |
| 4,885,535 | 12/1989 | Odagawa et al. . |
| 4,972,595 * | 11/1990 | Shimamura et al. ........... 33/365 |
| 5,042,158 * | 8/1991 | Schmelzer et al. ........... 33/366 |
| 5,157,842 * | 10/1992 | Swanda .................. 33/365 |
| 5,279,040 | 1/1994 | Kippelt et al. . |
| 5,365,671 | 11/1994 | Yaniger . |
| 5,612,679 | 3/1997 | Burgess . |
| 5,669,147 | 9/1997 | Nakajima et al. . |
| 5,841,273 * | 11/1998 | Muraji ............... 324/207.24 |
| 6,115,929 * | 9/2000 | Tanazawa et al. ........... 33/365 |

FOREIGN PATENT DOCUMENTS

| | | | |
|---|---|---|---|
| 4101060 * | 7/1992 | (DE) | ............. 33/100 |
| 513865 * | 11/1992 | (EP) | ............. 33/100 |
| 513866 * | 11/1992 | (EP) | ............. 33/100 |
| 405034150 * | 2/1993 | (JP) | ............. 33/100 |
| 405034151 * | 2/1993 | (JP) | ............. 33/100 |
| 405034152 * | 2/1993 | (JP) | ............. 33/100 |

* cited by examiner

*Primary Examiner*—Christopher W. Fulton
*Assistant Examiner*—Yaritza Guadalupe
(74) *Attorney, Agent, or Firm*—Kris T. Frederick

(57) ABSTRACT

A tilt sensor capable of sensing tilt in two axes includes an outer shell, a magnet at a fixed position inside the shell, and a reference element movable within the shell in response to gravity. Magnetic flux follows a plurality of paths from a pole of the magnet, around the shell, through the reference element, to the opposite pole of the magnet. Magnetic sensors detect changes in reluctance of the flux paths resulting from the movement of the reference element within the shell, from which the angle of tilt can be determined.

20 Claims, 4 Drawing Sheets

TILT SENSOR USING MAGNET AND MAGNETIC SENSOR

CROSS REFERENCE TO RELATED APPLICATIONS (IF ANY)

Not applicable.

U.S. GOVERNMENT RIGHTS (IF ANY)

Not applicable.

BACKGROUND OF THE INVENTION

1. Field of the Invention

The present invention relates generally to apparatus for sensing tilt, and more particularly to tilt sensors for magnetically sensing the tilt of an object.

2. Description of the Prior Art

Tilt sensors are used in a variety of applications to detect the angular orientation of an object with respect to a reference, usually supplied by gravity. Tilt sensors typically comprise a fixed element that is rigidly mounted to an object whose tilt is to be measured, a reference element that maintains a constant orientation with respect to gravity, and means for sensing the position of the reference element with respect to the fixed element.

Capacitive tilt sensors typically use conductive plates as part of the fixed element. A reference element such as a pendulum moves in or out of the space between the plates in response to a tilt, changing the permittivity of the space between the plates, and hence, the capacitance. Alternatively, the reference element may be a fluid that partially fills the space between the plates. The capacitance changes as the fluid-covered area of the plates changes. This change in capacitance is converted to a corresponding tilt angle. Since dielectric constants are greatly dependent upon ambient temperature, complex temperature compensation circuitry must be added for accurate tilt measurement in varying ambient temperatures.

Electrolytic tilt sensors are typically comprised of a nonconductive container that is partially filled with an electrolyte. At least three electrodes, including one common electrode, extend through the container so that at least a portion of each is immersed in the electrolyte. As the container is tilted, the electrodes become more or less immersed, causing a change in impedance between any one electrode and the common electrode. When the electrodes are configured as part of an appropriate electrical circuit, the angle of tilt can be correlated to an output voltage of the circuit. Problems with electrolytic tilt sensors include the fact that electrochemical reactions occur when a voltage is applied across an electrolyte. These reactions change the resistivity of the electrolyte, causing a deviation in the output voltage for a given tilt angle. Electrolytic tilt sensors therefore have relatively short lives. Response time is also limited due to the viscosity of the electrolyte, and the surface tension of the electrolyte can adversely affect resolution.

Magnetic tilt sensors typically comprise a permanent magnet housed in a nonmagnetic case. The magnet serves as the reference element, moving within the case in response to gravity. Magnetic sensors detect the position of the magnet within the case, and the tilt angle is determined therefrom. Numerous methods have been proposed for minimizing friction between the moving magnet and the surrounding case. Such methods have been unsatisfactory and often result in increased response times and decreased sensitivity.

Thus a need exists for a tilt sensor that has a simple structure, good response characteristics, and a long expected life.

BRIEF SUMMARY OF THE INVENTION

The present invention solves these and other needs by providing a tilt sensor comprising an outer shell, a magnet at a fixed position inside the shell, and a reference element movable within the shell in response to gravity. Magnetic flux follows a plurality of paths from a pole of the magnet, around the shell, through the reference element, to the opposite pole of the magnet. As the reference element moves within the shell, the lengths of the flux paths around the shell are changed. Magnetic sensors located along the paths detect the resulting changes in reluctance, from which the angle of tilt can be determined.

DETAILED DESCRIPTION OF THE INVENTION

Figure 1:
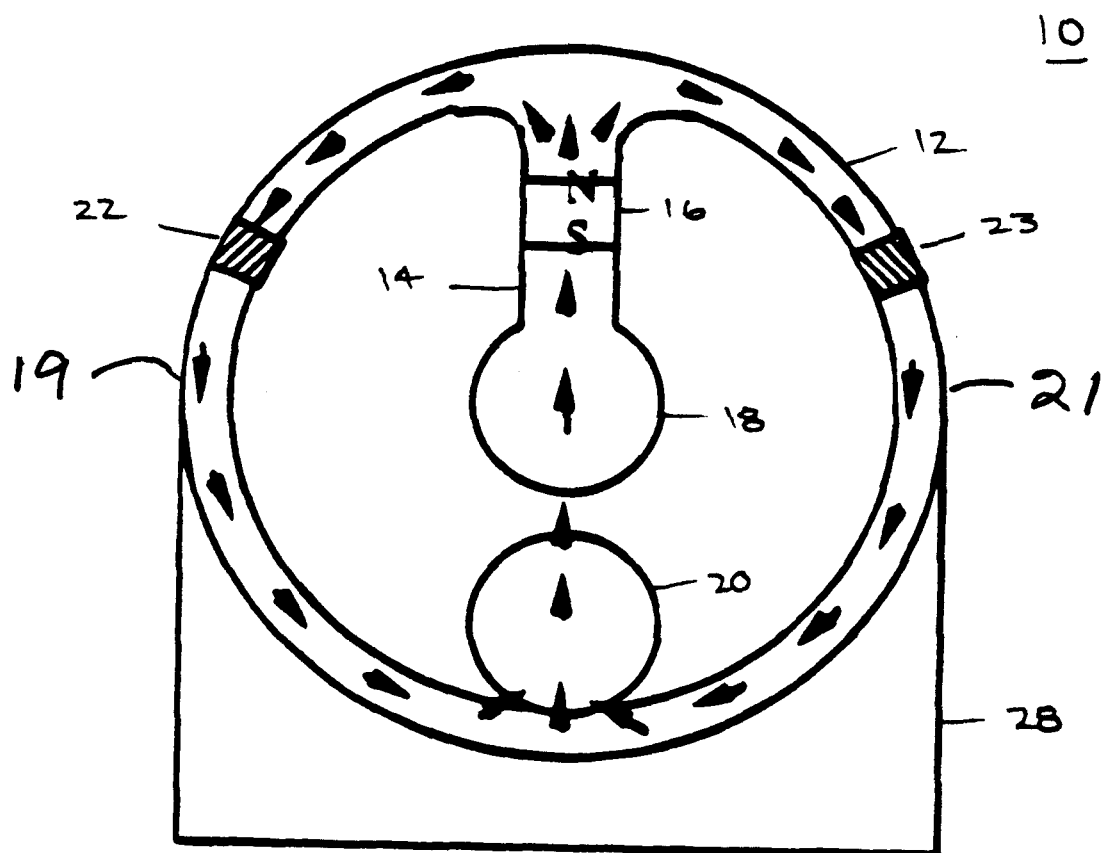
FIG. 1 is a cross-sectional view of a tilt sensor of the present invention in an untilted position.

Referring to FIG. 1, a tilt sensor 10 is shown having a spherical outer shell or enclosure 12. A cylindrical rod 14 is attached at one end to the inner surface of shell 12. Rod 14 includes a permanent magnet 16, and a spherical end portion 18. End portion 18 is positioned to be concentric with shell 12. A spherical reference element 20 is enclosed to roll freely inside shell 12 under the influence of gravity.

Shell 12 is supported by a stand 28 made from a nonmagnetic material such as plastic. Shell 12, rod 14, and reference element 20 are made from a magnetic material such as iron or a nickel-iron alloy.

Because the magnetic permeability of the ferromagnetic material is much greater than that of air, magnetic flux tends to follow a path from the N pole of magnet 16, around shell 12, through reference element 20, to the S pole of magnet 16. Magnetic sensors 22 and 23 are located at shell 12 at equal distances from the point at which rod 14 is attached to shell 12.

When tilt sensor 10 is in an untilted position as in FIG. 1, reference element 20 resides at the bottom of shell 12 so that a line drawn through the longitudinal axis of rod 14 would pass through the center of reference element 20. The lengths of all flux paths around shell 12 are thus equal, and magnetic flux is spread uniformly around shell 12. For example, flux path 19 and flux path 21 are equal.

Figure 2:
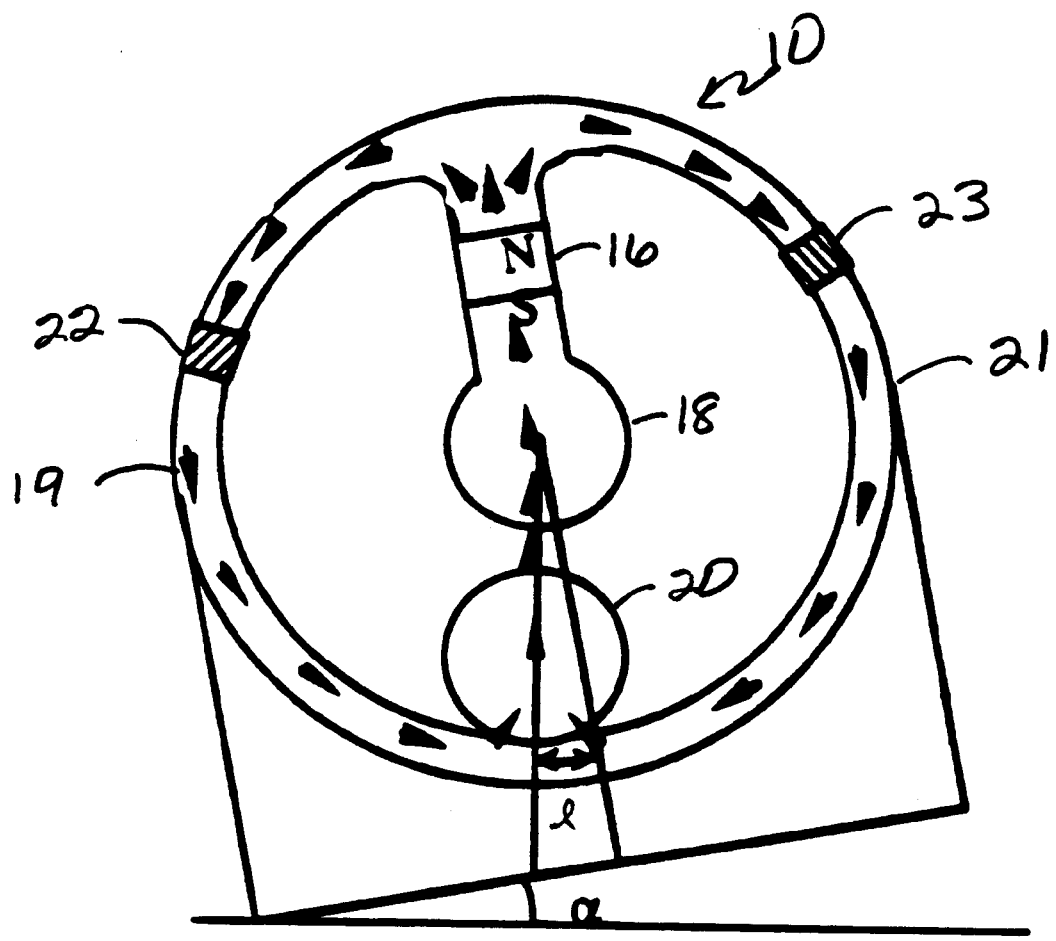
FIG. 2 is a cross-sectional view of the tilt sensor FIG. 1 in a tilted position.

When tilt sensor 10 is tilted at an angle a as shown in FIG. 2, reference element 20 rolls to a new lowest position in shell 12. The length of the flux path 19 along which sensor 22 is located is thereby decreased by a length 1. The length of the flux path 21 along which sensor 23 is located is increased by a length 1. Since the reluctance of each path increases with its length, magnetic sensors located at shorter flux paths will detect a higher flux density than sensors located at longer paths. Tilt angle a can be determined by comparing the outputs of the magnetic sensors.

Figure 3:
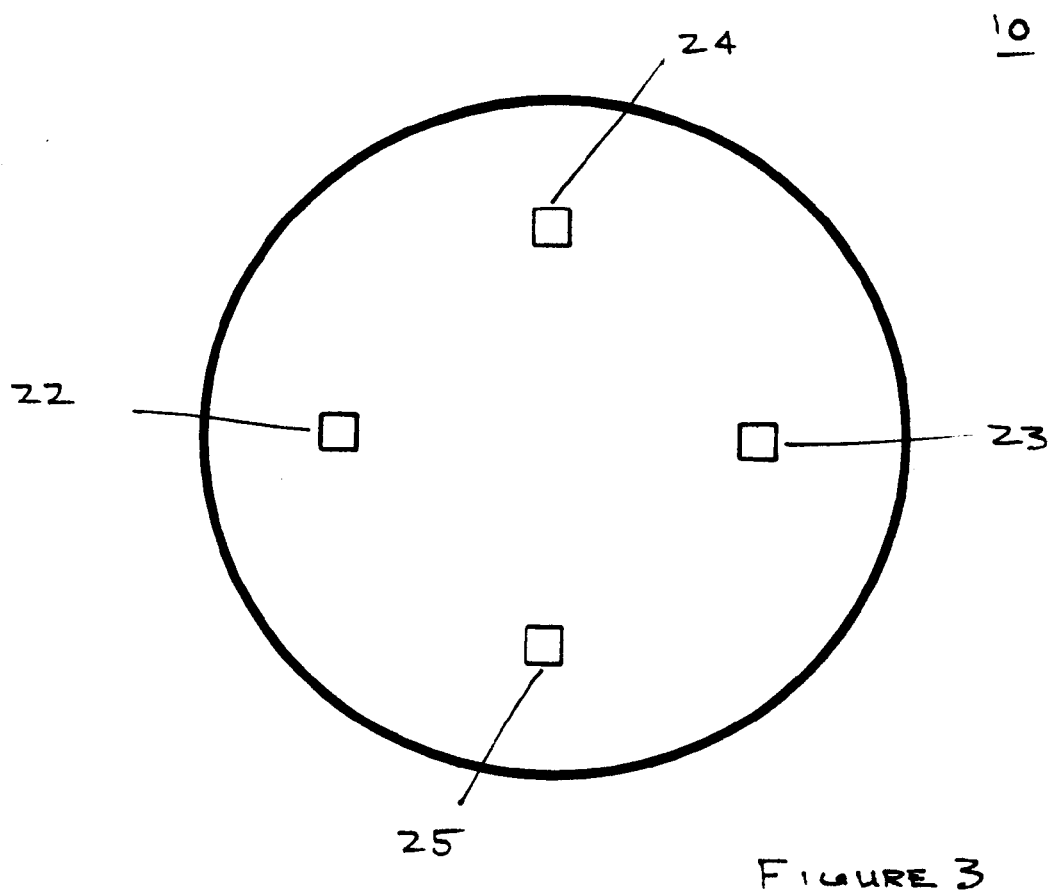
FIG. 3 is a top plan view showing the preferred arrangement of magnetic sensors.

To measure two dimensional tilt, another pair of magnetic sensors 24 and 25 is located at shell 12 on an axis perpendicular to magnetic sensors 22 and 23. FIG. 3 is a top plan view of the preferred arrangement. Magnetic sensors 22–25 are preferably Honeywell HMC1001 magnetoresistive sensors, but other types of magnetic sensors, including Hall-effect sensors, can be used.

Figure 4:
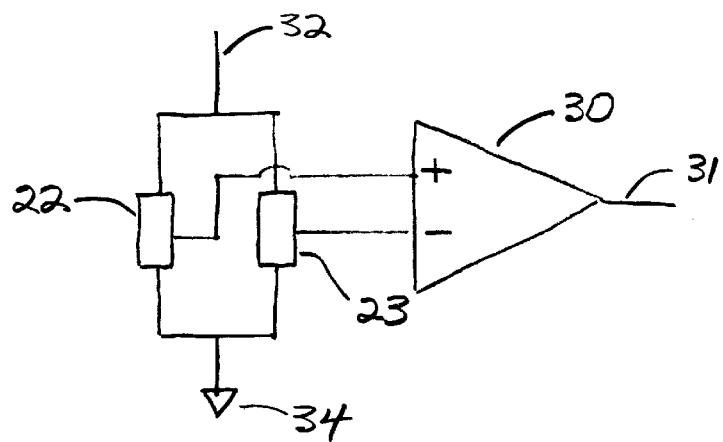
FIG. 4 is a schematic diagram of the sensor arrangement of FIG. 3.
Figure 4:
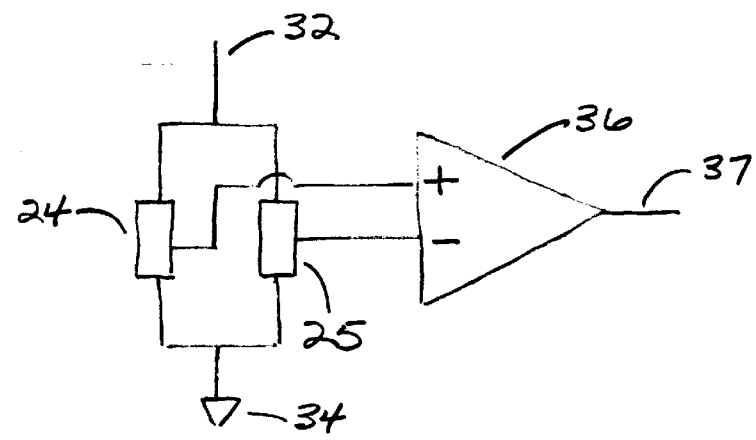

With reference to FIG. 4 sensors 22 and 23 are shown connected between a voltage source 32 and ground 34. As described hence before with sensor 10 in an untilted position reference element 20 will be in a position so that the flux path through sensor 22 and the flux path through sensor 23 will be substantially equal so that the output from sensor 22 and sensor 23 will be equal.

The outputs of opposing sensors 22 and 23 are combined in a balanced differential amplifier 30, shown in FIG. 4, to produce an electrical signal 31 corresponding to the angle of tilt along the axis of sensors 22 and 23. The outputs of magnetic sensors 24 and 25 are similarly combined in amplifier 36 to produce a signal 37 corresponding to the angle of tilt along the axis of sensors 24 and 25.

Figure 5:
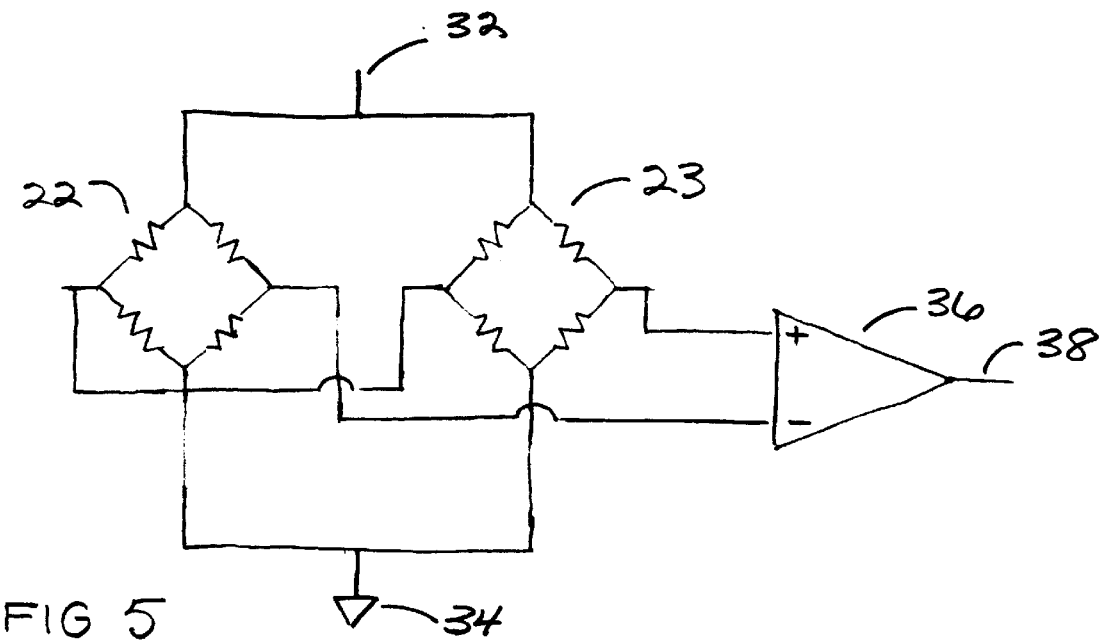
FIG. 5 is a schematic diagram of a sensor arrangement for a specific sensor type.

FIG. 5 illustrates the connection of magnetoresistive sensors such as Honeywell HMC1001 sensors so that a differential input is connected to differential amplifier 36 to provide an output 38.

Several possible variations of the present invention will be apparent to those of ordinary skill in the relevant arts. For example, shell 12, end portion 18 and reference element 20 need not be spherical. It is, however, important that the distance between reference element 20 and end portion 18 remains substantially constant throughout the entire range of tilt to be measured. A change in reluctance caused by a variation in the length of the path around the shell would otherwise be insignificant in comparison to the change in reluctance caused by a variation in distance between reference element 20 and end portion 18.

For some applications, it may be desirable to use an electromagnet in place of permanent magnet 16, or to fill shell 12 with a damping fluid to alter the response of characteristics of the sensor. Rather than allowing reference element 20 to roll within shell 12, it may in some instances be preferable to attach it to rod 14 by means of a rotating or movable coupling, for example, a ball and socket joint.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description.

What is claimed is:

1. An apparatus for sensing tilt, comprising:
   a shell having an inner surface;
   a reference element enclosed within said shell, wherein said reference element is operable to roll along said inner surface responsive to said apparatus undergoing a tilt;
   a magnet secured at a fixed position relative to the inner surface of said shell, wherein said magnet has a first pole and a second pole, and wherein said magnet produces a magnetic flux along a plurality of paths from said first pole, through said shell, through said reference element to said second pole; and
   a plurality of magnetic sensors located along said paths to detect changes in reluctance of said paths in response to said reference element rolling along said inner surface.

2. Apparatus of claim 1 wherein each of said paths has substantially the same reluctance when said apparatus is in an untilted position.

3. The apparatus of claim 1, wherein said magnetic sensors are positioned to detect tilt in two dimensions.

4. An apparatus for sensing tilt, comprising:
   a shell having an inner surface;
   a reference element enclosed within said shell, wherein said reference element is operable to roll along said inner surface responsive to said apparatus undergoing a tilt;
   a magnet secured at a fixed position relative to the inner surface of said shell, wherein said magnet has a first pole and a second pole, and wherein said magnet produces a magnetic flux along a plurality of paths from said first pole, through said shell, through said reference element to said second pole;
   an end piece secured to said magnet with a portion of said end piece having a form similar to a form of said inner surface; and
   a plurality of magnetic sensors located along said paths to detect changes in reluctance of said paths in response to said reference element rolling along said inner surface.

5. Apparatus of claim 4 wherein said form is spherical.

6. Apparatus of claim 4 wherein said form is cylindrical.

7. Apparatus of claim 4 wherein said shell and said portion of said end piece are concentric.

8. An apparatus for sensing tilt, comprising:
   a shell having an inner surface;
   a reference element enclosed within said shell, wherein said reference element is operable to roll along said inner surface responsive to said apparatus undergoing a tilt;
   a magnet having a first pole and a second pole;
   means for attaching said magnet secured at a fixed position relative to the inner surface, thereby placing said magnet in a fixed position with respect to said inner surface, wherein said magnet produces a magnetic flux along a plurality of paths from said first pole, through said supporting means, through said shell, through said reference element, to said second pole; and
   a plurality of magnetic sensors located along said paths to detect changes in reluctance of said paths in response to said reference element rolling along said inner surface.

9. The apparatus of claim 8, wherein said magnetic sensors are positioned to detect tilt in two dimensions.

10. An apparatus for sensing tilt, comprising:
   a shell having an inner surface;
   a reference element enclosed within said shell, wherein said reference element is operable to roll along said inner surface responsive to said apparatus undergoing a tilt;
   a magnet having a first pole and a second pole;
   means for attaching said magnet to secured at a fixed position relative to the inner surface, thereby placing said magnet in a substantially fixed position with respect to said inner surface, wherein said attaching means comprises a rod having a first attached end to an inner surface of said shell and a second end having a form similar to a form of said shell, and wherein said magnet produces a magnetic flux along a plurality of paths from said first pole, through said supporting means, through said shell, through said reference element, to said second pole; and
   a plurality of magnetic sensors located along said paths to detect changes in reluctance of said paths in response to said reference element rolling along said inner surface.

11. Apparatus of claim 10 wherein said form is spherical.

12. Apparatus of claim 10 where in said form is cylindrical.

13. Apparatus of claim 10 wherein said shell and said form of said second end are concentric.

14. Apparatus of claim 10 wherein said reference element is spherical.

15. Apparatus for sensing tilt, comprising:

a substantially spherical enclosure having an inner surface;

a substantially spherical reference element, wherein said reference element is operable to roll along said inner surface responsive to said apparatus undergoing a tilt;

a magnet secured at a fixed position on said inner surface of said enclosure wherein said magnet is operable to cause magnetic flux along a first path having a first length and wherein said magnet is operable to cause magnetic flux along a second path having a second length;

a first magnetic sensor located along said first path; and a second magnetic sensor located along said second path with said first and second sensors responsive to a change in said first length and said second length.

16. Apparatus of claim 15 wherein said first path and said second path have the same reluctance when said apparatus is in an untilted position.

17. Apparatus of claim 15 wherein said magnet and said reference element are separated by an air gap.

18. Apparatus of claim 17 wherein said first path and said second path have the same reluctance when said apparatus is in an untilted position.

19. The apparatus of Claim 15, wherein said magnet is operable to cause magnetic flux along a third path having a third length, wherein said magnet is operable to cause magnetic flux along a fourth path having a fourth path length, comprising:

a third magnetic sensor located along said third path; and a fourth magnetic sensor located along said fourth path, wherein said first, second, third, and fourth magnetic sensors are positioned to detect tilt in two dimensions.

20. Apparatus for sensing tilt, comprising:

a substantially spherical enclosure having an inner surface;

a substantially spherical reference element, wherein said reference element is operable to roll along said inner surface responsive to said apparatus undergoing a tilt;

a magnet located at a fixed position relative to the inner surface of said enclosure wherein said magnet is operable to cause magnetic flux along a first path having a first length and wherein said magnet is operable to cause magnetic flux along a second path having a second length;

an end piece secured to said magnet, wherein said end piece is substantially spherical;

a first magnetic sensor located along said first path; and a second magnetic sensor located along said second path with said first and second sensors responsive to a change in said first length and said second length.

* * * * *